United States Patent

Schäfer et al.

[11] Patent Number: 5,335,178
[45] Date of Patent: Aug. 2, 1994

[54] SLIP CONTROL DECELERATION SIGNAL FILTERING SYSTEM

[75] Inventors: Jochen Schäfer, Ludwigsburg; Thomas Frank; Frank Bederna, both of Markgröningen, all of Fed. Rep. of Germany

[73] Assignee: Robert Bosch GmbH, Stuttgart, Fed. Rep. of Germany

[21] Appl. No.: 775,945

[22] PCT Filed: Mar. 30, 1990

[86] PCT No.: PCT/EP90/00503
§ 371 Date: Oct. 21, 1991
§ 102(e) Date: Oct. 21, 1991

[87] PCT Pub. No.: WO90/12702
PCT Pub. Date: Nov. 1, 1990

[30] Foreign Application Priority Data

Apr. 21, 1989 [DE] Fed. Rep. of Germany ....... 3913059

[51] Int. Cl.$^5$ .............................................. B60T 8/32
[52] U.S. Cl. ............................. 364/426.02; 364/174; 318/52; 303/93; 303/97
[58] Field of Search .............. 364/426.02, 426.03, 364/174, 153; 180/197; 303/95-103, 93; 318/52

[56] References Cited

U.S. PATENT DOCUMENTS

| | | | |
|---|---|---|---|
| 3,719,399 | 3/1973 | Adahan | 303/21 BE |
| 3,811,526 | 5/1974 | Adahan | 180/82 R |
| 4,583,611 | 4/1986 | Frank et al. | 180/197 |
| 5,003,481 | 3/1991 | Matsuda | 364/426.02 |
| 5,012,417 | 4/1991 | Watanabe et al. | 364/426.02 |
| 5,019,985 | 5/1991 | Yasuno et al. | 364/426.02 |
| 5,070,460 | 12/1991 | Yasuno | 364/426.02 |

Primary Examiner—Jerry Smith
Assistant Examiner—Cameron H. Tousi
Attorney, Agent, or Firm—Felfe & Lynch

[57] ABSTRACT

The invention relates to a method for filtering out disturbances in the form of short term wheel acceleration signals when the wheel exhibits an overall deceleration, so that a more accurate deceleration signal can be used for control of drive slippage.

Wheel speed v is measured at intervals $T_A$ and speed changes for each interval are determined. When a change is negative or zero following a positive change in a previous interval, the wheel speed is stored as a maximum speed $v_{max}$ while v continues to be measured and a counter determines the period of time $\Delta t$ between the occurrence of $v_{max}$ and the instantaneous value v. Beginning at a predetermined filtering time $\Delta T$ after storing $v_{max}$, a quotient $\Delta v / \Delta t$ representing the filtered slope of the value v is determined and used as a control variable to regulate wheel slippage.

7 Claims, 2 Drawing Sheets

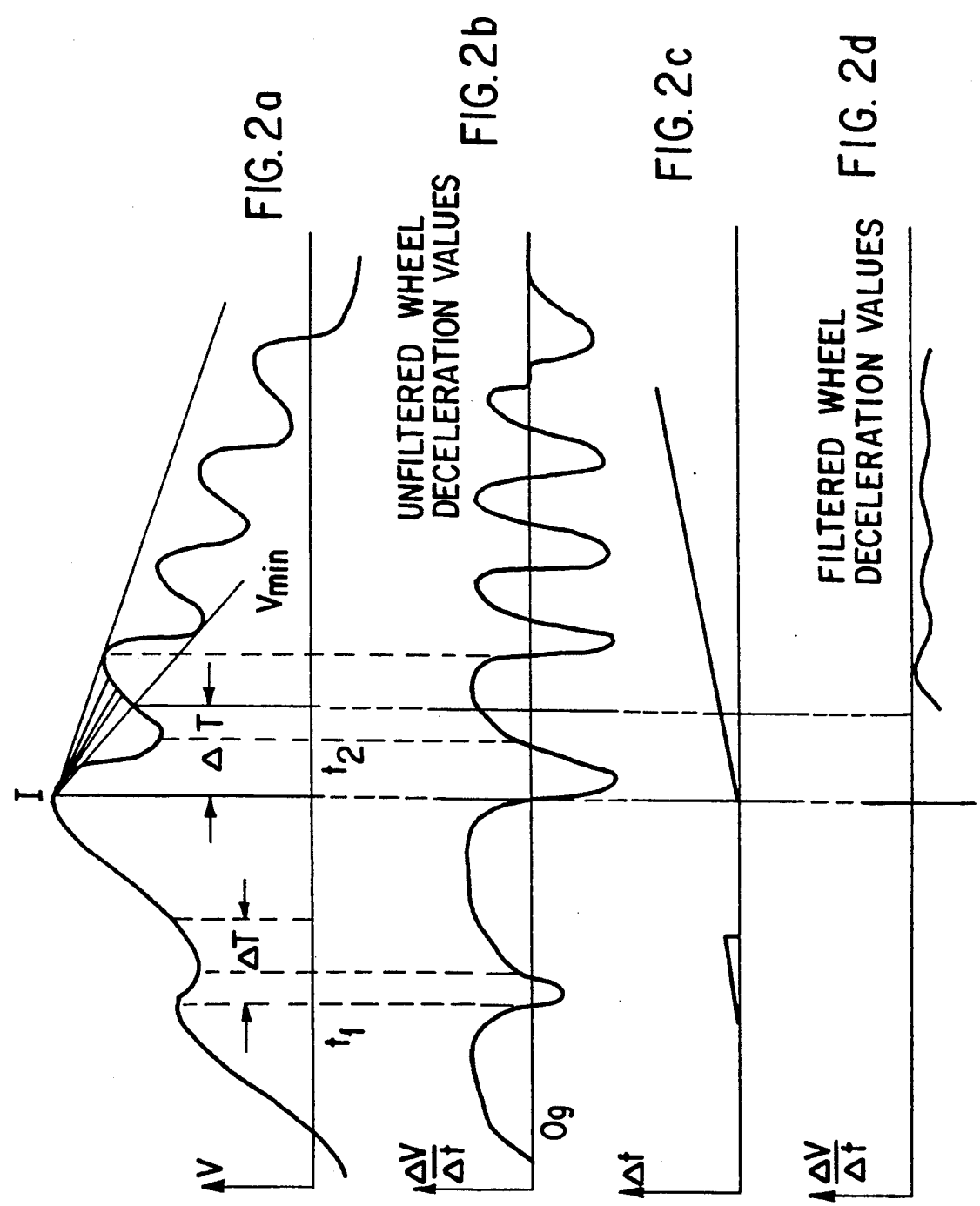

SLIP CONTROL DECELERATION SIGNAL FILTERING SYSTEM

BACKGROUND OF THE INVENTION

As is known, In drive slip control the wheel brake is actuated and/or the driving torque of the engine reduced if wheels are spinning. During the overall process, the wheel speed passes through a maximum and then decelerates. This deceleration can be used to end the further increasing of the actions taken to reduce the drive slip or to reduce the action, thus, for example, to discontinue the increase in the brake pressure or even to reduce it or to discontinue throttling back the throttle valve or even to increase the throttle-valve angle.

The acquisition of the deceleration signal is critical when wheel and axle vibrations occur and a disturbance is superposed on the measured wheel speed signal. Although the wheel is decelerated overall, large wheel accelerations may even be detected from time to time. In order to avoid incorrect reactions, the disturbance must be filtered out.

SUMMARY OF THE INVENTION

The invention shows an effective acquisition of a filtered signal, for example the deceleration signal in the case of ASR, which provides a usable useful signal even in the case of large disturbances.

BRIEF DESCRIPTION OF THE DRAWINGS

FIG. 2a is a plot showing a disturbed speed signal during a control cycle;

FIG. 2b is a plot showing the unfiltered wheel deceleration values determined from the speed signal of FIG. 2a;

FIG. 2c is a plot showing the contents of a counter indicating time since storage of a maximum speed;

FIG. 2d is a plot showing the filtered wheel deceleration for the speed signal of FIG. 2a.

DETAILED DESCRIPTION OF THE PREFERRED EMBODIMENT

Figure 1:
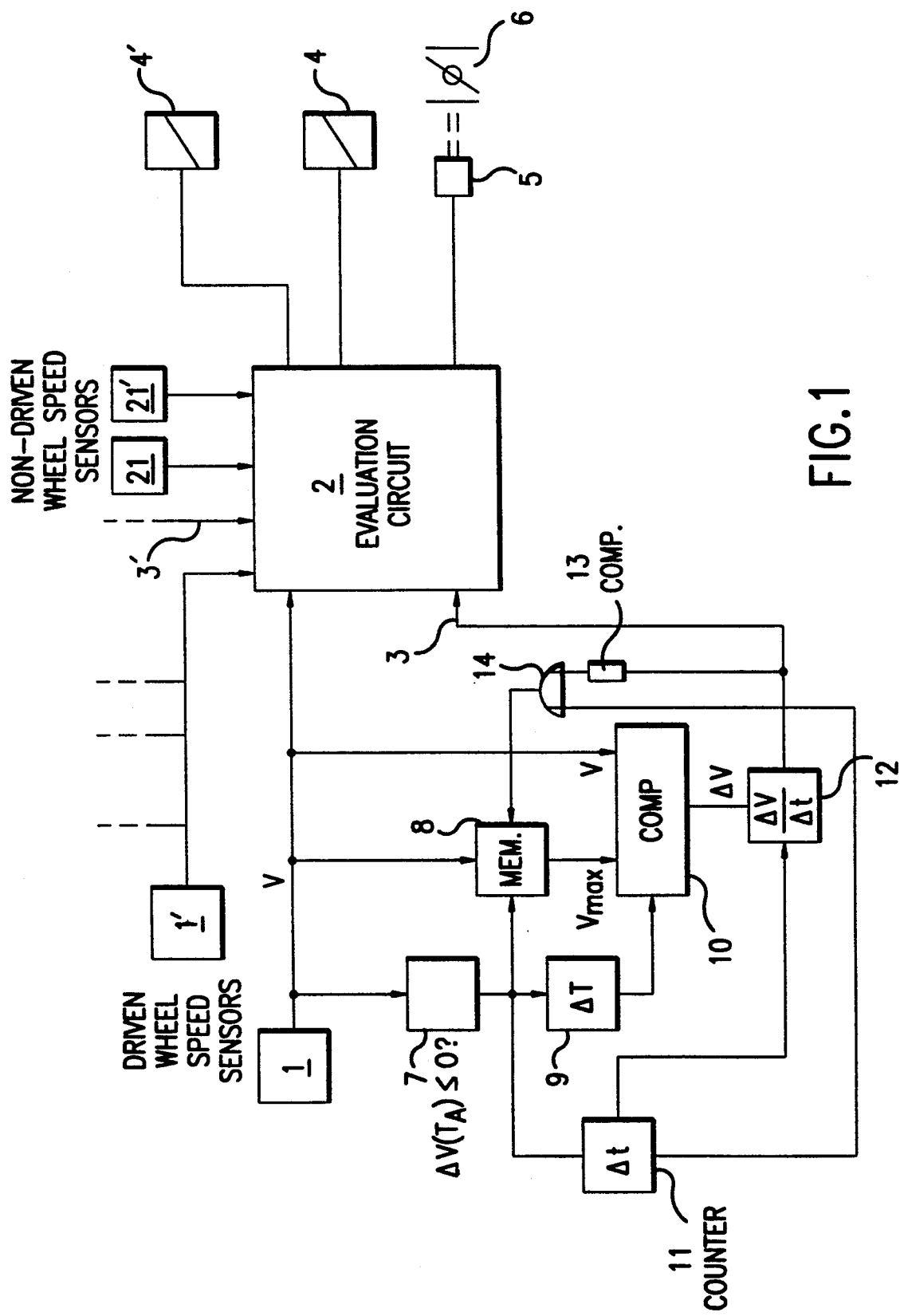
FIG. 1 shows a block diagram of an illustrative embodiment.

In FIG. 1 of the drawing, 1 denotes a speed sensor of a driven wheel together with digital evaluation, which delivers its signal to an evaluation circuit 2. From this signal, the signal of a transmitter assigned to the second driven wheel, the signals of transmitters assigned to the non-driven wheels, the wheel signed supplied via line 3 and the corresponding signal of the other driven wheel, the evaluation circuit 2 produces control signals for brake-pressure control valves 4, and for an adjusting motor 5 for a throttle valve 6. Brake pressure is, for example, fed in when one of the driven wheels exceeds a drive slip of predetermined magnitude, and the engine torque is reduced if both wheels have a corresponding drive slip. Pressure reduction should be initiated if the braked wheel injects a signal via line 3 or the engine torque is increased again if a signal from both wheels corresponding to that on line 3 occurs.

A signal is injected via line 3 if the wheel deceleration exceeds a predetermined, small deceleration value. This signal should be produced without error even if a disturbance signal is superposed on the signal of the transmitter.

FIG. 2a) shows the characteristic of a control cycle of such a disturbed speed signal. It can be seen that, although the wheel is decelerated overall., phases of pronounced wheel accelerations occur. An unfiltered signal would trigger incorrect influencing measures. FIG. 2b, which shows the wheel acceleration, confirms this statement.

In a block 7, a test is carried out in each measurement interval of the digital speed measurement in block 1 to determine whether, after a previously rising speed, the speed change becomes 0 or negative. If this is the case, the speed value $v_{max}$ is stored as maximum value in a memory 8. This is the case, for example, at instant $t_1$ in FIG. 2a. After a time $\Delta T$ after storage, predetermined by a timing element 9, a comparator 10 is activated which compares the stored value $v_{max}$ of the memory 8 with the instantaneous value v of the speed signal and produces an instantaneous speed difference $\Delta v = v - v_{max}$.

Also accompanying storage was the activation of a time counter 11 which, in a block 12, assigns to each of the successively occurring speed differences $\Delta V$ a $\Delta t$ (period of time between storage and the instantaneous difference), i.e. $\Delta V/\Delta t$. Since the first $\Delta V/\Delta t = \Delta V/\Delta T$ formed after $t_1 + \Delta T$ is greater than the small threshold value predetermined in a comparator 13, the latter produces a signal which erases the memory 8.

In block 7, it is also possible for a response threshold corresponding to $v_{min}$ in FIG. 2a to be predetermined in order to ensure that filtering is only carried out from a threshold Value $v_{min}$ of the speed signal.

At instant $t_2$, a maximum value is again stored in the memory 8. After the time $\Delta T$, the quotient of the $\Delta V$ coming from the comparator 10 and of the $\Delta t$ coming from the counter 11 is formed in block 12 at each measurement instant of the wheel speed and is supplied to the evaluation circuit 2. This quotient corresponds to the respective slope of the straight lines starting from point I, the said lines lying within a funnel. All slopes determined are negative although pronounced accelerations of the wheel occur. If either the counter 11 reaches a terminal value (e.g. 1 sac) or the value for $\Delta V/\Delta t$ exceeds a small value of, for example, about 0.06 km/h/5 msec, the memory 8 is erased via an OR gate 14 and a new search for a maximum begins.

FIG. 2c furthermore shows the contents of the counter 11 and FIG. 2d shows the wheel-deceleration values achieved by the filtering, which are clearly improved compared to the unfiltered values of FIG. 2b.

We claim:

1. Method for controlling wheel slippage in a vehicle comprising
   determining the speed of a driven wheel and producing an instantaneous digital wheel speed value v at time points displaced by measurement intervals $T_A$,
   determining the speed change during each measurement interval $T_A$,
   storing said value v as a maximum $v_{max}$ when said speed change is equal to or less than zero in a measurement interval $T_A$ immediately following an interval $T_A$ in which a speed change greater than zero was determined,
   determining a difference $\Delta v = v_{max} - v$,
   determining a quotient $\Delta v/\Delta t$ beginning at predetermined filtering time $\Delta T$ after storing $v_{max}$, where $\Delta t$ is elapsed time after storing $v_{max}$ said quotient representing a filtered slope of the value v, and
   using said quotient as a control variable to regulate wheel slippage.

2. Method as in claim 1 further comprising comparing said wheel speed value v to a threshold value and determining said quotient $\Delta v/\Delta t$ only when said wheel speed value exceeds said threshold value.

3. Method as in claim 1 wherein said wheel speed signal exhibits a disturbance characterized by an expected period, said predetermined filtering time $\Delta T$ being greater than half the expected period.

4. Method as in claim 1 further comprising comparing said quotient $\Delta v/\Delta t$ to a threshold value and producing an intervention signal when the threshold value is exceeded.

5. Method as in claim 1 further comprising comparing said period of time $\Delta t$ to a threshold value and producing an intervention signal when the threshold value is exceeded.

6. Method as in claim 1 further comprising comparing said quotient $\Delta v/\Delta t$ to a deceleration threshold value and erasing the stored value $v_{max}$ when said quotient exceeds a predetermined threshold.

7. Method as in claim 1 further comprising comparing said period of time $\Delta t$ to a predetermined period of time and erasing the stored value $v_{max}$ when said period of time $\Delta t$ exceeds said predetermined period of time.

* * * * *

UNITED STATES PATENT AND TRADEMARK OFFICE
CERTIFICATE OF CORRECTION

PATENT NO. : 5,335,178
DATED : August 2, 1994
INVENTOR(S) : Jochen Schafer et al.

Page 1 of 2

It is certified that error appears in the above-indentified patent and that said Letters Patent is hereby corrected as shown below:

| | |
|---|---|
| Col. 1, line 6 | "In drive slip" should be --in drive slip--; |
| Col. 1, line 48 | After "transmitter" insert --1--; |
| Col. 1, line 49 | After "transmitters" insert --21,21'--; |
| Col. 1, line 51 | After "signal" insert --3'--; |
| Col. 1, line 53 | After "4," insert --4'--; |

UNITED STATES PATENT AND TRADEMARK OFFICE
CERTIFICATE OF CORRECTION

PATENT NO. : 5,335,178
DATED : August 2, 1994
INVENTOR(S) : Jochen Schafer et al.

It is certified that error appears in the above-indentified patent and that said Letters Patent is hereby corrected as shown below:

Col. 2, line 33      "At" should be --$\Delta t$--;

Col. 2, line 41      "(e.g. 1 sac)" should be --(e.g. 1 sec)--; and

Col. 2, line 65      "At" should be --$\Delta t$--.

Signed and Sealed this

Twenty-eight Day of February, 1995

BRUCE LEHMAN

Attest:

Attesting Officer     Commissioner of Patents and Trademarks